Oct. 29, 1935.  C. R. TAYLOR  2,019,202
DISPENSING APPARATUS
Filed Jan. 6, 1933   2 Sheets-Sheet 1
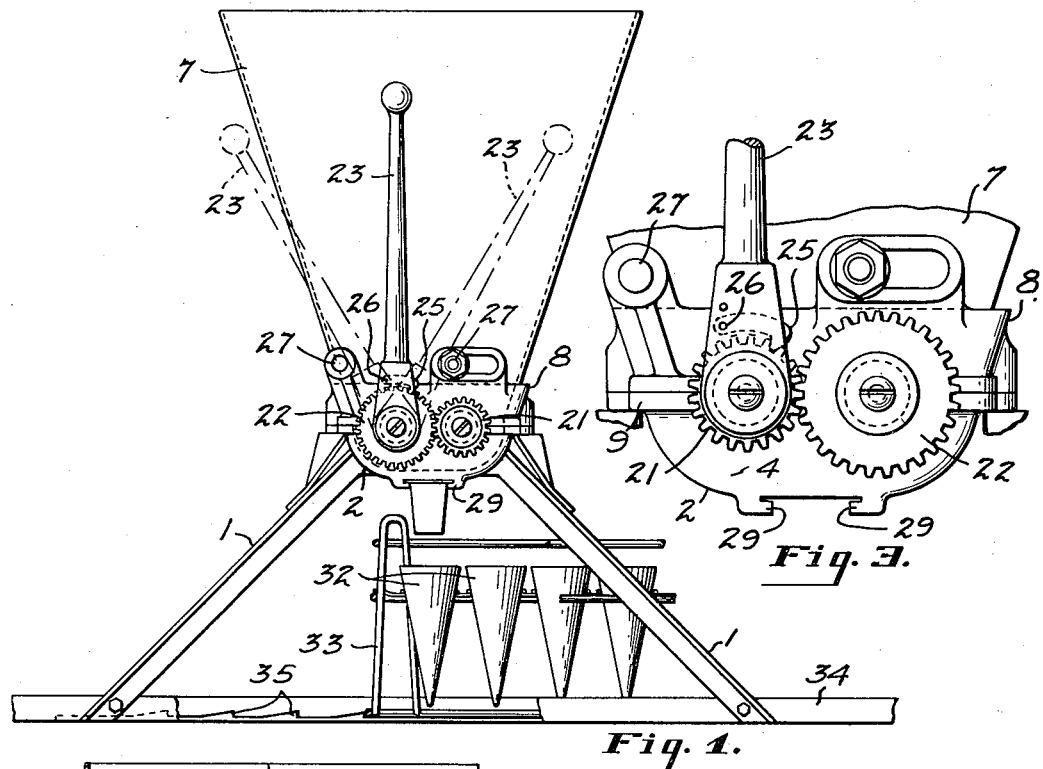
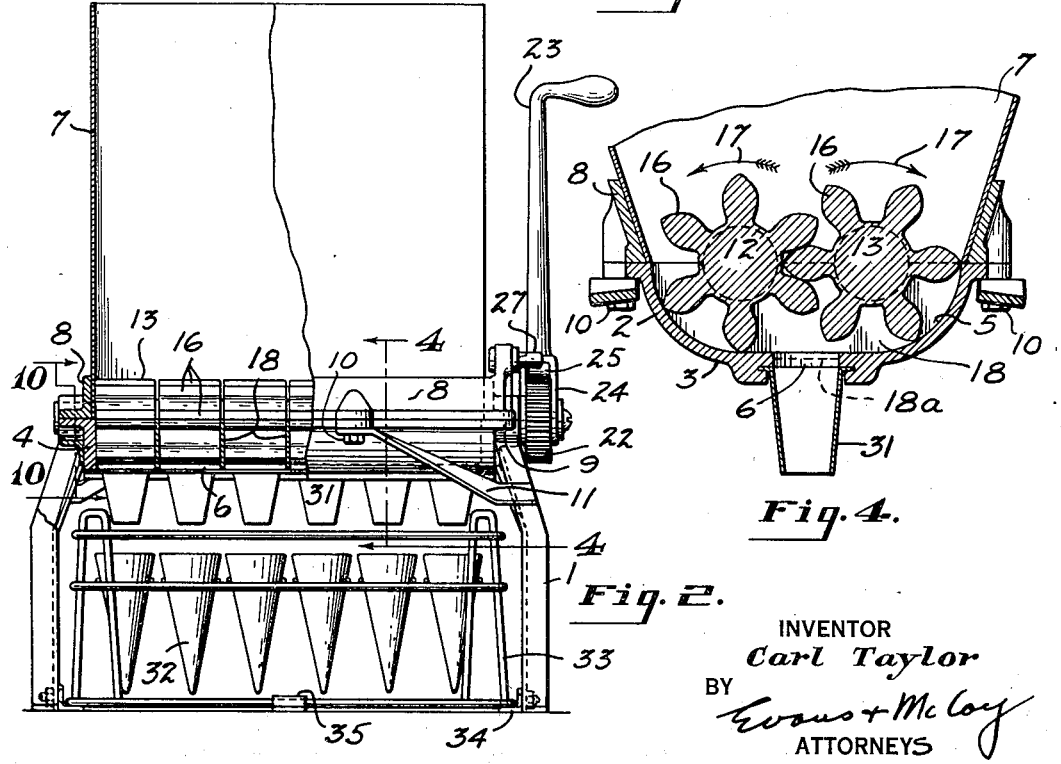
INVENTOR
Carl Taylor
BY
Evans + McCoy
ATTORNEYS Oct. 29, 1935.  C. R. TAYLOR  2,019,202
DISPENSING APPARATUS
Filed Jan. 6, 1933  2 Sheets—Sheet 2
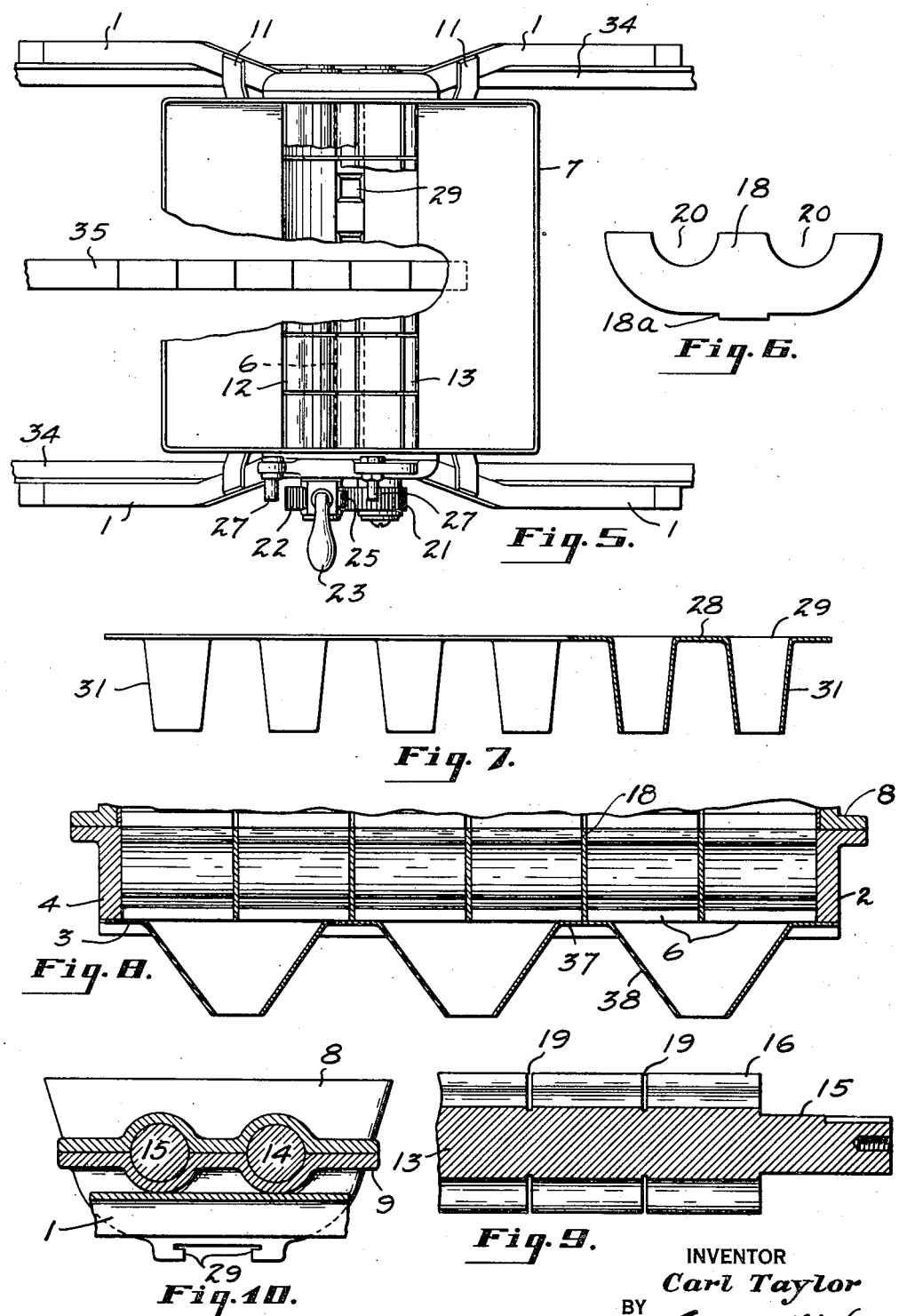

Patented Oct. 29, 1935

2,019,202

UNITED STATES PATENT OFFICE 2,019,202

DISPENSING APPARATUS

Carl R. Taylor, Cleveland Heights, Ohio, assignor, by mesne assignments, to Mojonnier Bros. Co., Chicago, Ill., a corporation of Illinois Application January 6, 1933, Serial No. 650,470

4 Claims. (Cl. 226—94)

This invention relates to dispensing apparatus and more particularly to apparatus for filling containers and the like with a semi-solid material such as ice cream, ices, cottage cheese and the like.

One of the objects of the present invention is to provide a new and improved apparatus of relatively simple construction for quickly and easily filling containers and the like with a semi-solid material.

Another object is to provide a dispensing apparatus for accurately filling containers and the like with a predetermined quantity of a semi-solid material.

Another object is to provide a dispensing apparatus with improved means for quickly and easy filling a plurality of containers and the like simultaneously, with accurately determined quantities of semi-solid material.

A further object is to provide the hopper of a dispensing apparatus with gear means for dispensing predetermined quantities of a semi-solid material and with further means whereby predetermined quantities of the material may be simultaneously discharged into a plurality of containers or the like.

With the above and other objects in view, which will be apparent from the following detailed description, the present invention consists of certain features of construction and combinations of parts which will be readily apparent to those skilled in the art to which the invention appertains.

In the drawings, which illustrate a suitable embodiment of the invention:

Figure 1 is an end view of the dispensing apparatus, the extreme operating positions of the operating handle thereof being shown in dotted outline;

Fig. 2 is a side elevation of the apparatus shown in Fig. 1, a portion of the same being broken away and shown in section;

Fig. 3 is an enlarged view of the operating gears of the apparatus illustrated in Fig. 1 but showing the two gears reversed with respect to the showing in Fig. 1;

Fig. 4 is an enlarged section taken approximately on the line 4—4 of Fig. 2;

Fig. 5 is a plan view of the apparatus illustrated in Fig. 1, a portion of the same being broken away to show the latch bar for properly locating the tray which contains the articles to be filled;

Fig. 6 is a side elevation of one of the separator plates employed to divide the hopper into compartments;

Fig. 7 is a side elevation of the discharge plate, a portion of the same being broken away and shown in section;

Fig. 8 is a view showing a modified discharge plate wherein two of the openings in the hopper may discharge into a single nozzle;

Fig. 9 is a longitudinal section taken through one of the dispensing gears to show the circumferential grooves thereof; and Fig. 10 is a section taken approximately on the line 10—10 of Fig. 2.

Referring to the accompanying drawings, in which like numerals refer to like parts throughout the several views, the apparatus of the present invention includes a pair of spaced standards 1 which support a troughlike holder 2 which comprises a relatively flat bottom 3, end walls 4 and opposed arcuate side walls 5. The bottom 3 is provided with an elongated discharge slot or opening 6 extending from end to end for the discharge of a semi-solid material therethrough. The holder 2 is also provided with a suitable feed hopper 7 having an open rectangular framework 8 secured to its side and end walls at their lower edges. This framework 8 is supported on outwardly extending ledges 9 formed on the outer surfaces of holder 2 and is secured to the ledges 9 by any suitable means. This is accomplished in one manner, as shown in Fig. 2, by cap screws 10 extending through reinforcing braces 11 provided on the standards 1 and through the side of the ledges 9, and then being threaded into the framework 8 in order to permit an easy removal of the hopper.

The means for dispensing the material comprises a pair of meshing gears 12 and 13 formed with shaft portions 14 and 15, respectively, of reduced diameter at their outer ends, the shaft portions being journaled between the ledges 9 and the end portions being journaled between the ledges 9 and the end portions of the hopper framework 8, as more clearly shown in Fig. 10. These gears preferably extend the full length of the holder 2 and are substantially of the same radius as the arcuate side walls 5 of the holder so that when they are mounted in operating position they will have a small operating clearance with these arcuate side walls. Each gear is provided with a relatively small number of teeth 16, as shown in Fig. 4, which mesh with the teeth of the other gear. The gears rotate in a direction away from each other, as indicated by the arrows 17 in Fig. 4 so that the semi-solid material is carried between adjacent teeth of each gear to the space defined by the gears and the bottom of the holder, where the material is discharged or actually forced through the opening 6.

In order that predetermined quantities of the material may be discharged through the opening 6, upwardly extending separators 18 are provided at regularly spaced intervals to extend between the arcuate side walls 5. These separators may be individual units, as shown in Fig. 6, and provided with small tongue portions 18a extending into the opening 6 in the bottom 3 of the holder 2, as shown in Fig. 2 or they may be formed as an integral part of the holder 2. The gears 12 and 13, as before stated, extend the full length of the holder, but in order to accommodate the separators 18, each gear is formed with circumferential grooves 19 for receiving the separators 18. These grooves 19 are slightly deeper than the depth of the teeth, as indicated in Fig. 9. Furthermore, the separators 18 are provided with spaced semi-circular recesses 20 along their upper edges so that they may extend into the grooves 19 of the gears. As shown in the drawings, each of the gears is of a single piece of metal but it is to be understood that each dispensing gear may be formed of a plurality of individual gears separated from each other by suitable spacers.

The gear 12 is driven by the gear 13 and because of this the gear 13 is driven by the gear 21. They are rigidly secured to the end of the shaft portion 15 thereof which projects beyond the supporting standard 1, as indicated in Fig. 2. The gear 21 meshes with a driving gear 22 that is mounted to freely rotate on the shaft portion 14 of the gear 12 and the gear 22 is preferably driven by a ratchet mechanism comprising a handle or crank 23 having a forked end 24 mounted to pivot on the shaft portion 14 and to straddle the gear 22. A suitable pawl 25 is positioned between the legs of the forked end of the crank and is pivoted thereto by means of a pivot pin 26. This pawl is engageable with the teeth 22 to rotate the same and thereby rotate the two feed gears.

As viewed in Fig. 1, the crank 23 is moved to the right a predetermined distance and the pawl 25 engages with a tooth of the gear 22. The crank 23 is then moved back to the left, which through the engagement of the pawl 25 rotates the gears 22 and 21 to thereby cause the gears 12 and 13 to rotate in directions opposite to each other. Upon the next movement to the right the pawl disengages and travels over the teeth of the gear 22. The movement of the crank to the right or to the left may be limited as desired by such means as stop pins 27, one of which may be adjustable in order to obtain a predetermined stroke with the result that a predetermined quantity of material may be discharged upon each stroke of the crank 23. It is obvious, however, that other means of limiting the stroke of the crank 23 may be employed.

The gears 12 and 13 and the hopper and holder 2 are formed of any desired material, which will not have any chemical effect upon the semi-solid material being dispensed.

In order that the material to be dispensed may be properly distributed, the plate 28 having apertures 29 therein is provided to slide in guideways 29 formed on the bottom of the holder 2 and this plate 28 is provided with discharge conduits or nozzles 31, as illustrated in Figs. 2, 4 and 7, for directing the material being dispensed into the containers 32 disposed beneath the nozzles 31. The containers 32, such as ice cream cones, are carried in a tray or basket 33 which supports the containers in an upright position and which is movable by hand beneath the nozzles 31. This may be accomplished in any desired manner. However, as shown in Figs. 1 and 2, the tray is supported on side guides 34 each of which extend between the legs of the side support 1.

As viewed in Fig. 1, the tray 33 containing the containers 32 is moved from left to right and in order to properly position each row of containers 10 below the nozzles 31 a ratchet bar 35 is provided below the tray 33, the teeth of the bar being spaced a distance apart equal to the spacing of the rows of containers. The tray 33, after each row of containers is filled, is moved a distance equal to one tooth spacing and is then pulled back so that the rear edge thereof will abut against the adjacent tooth of the ratchet bar, as shown in Fig. 1, thereby insuring that the next entire filled row of containers will be in the proper material receiving position.

When larger containers are employed and a fewer number are arranged in each row in the basket, the nozzle plate 28 may be removed and replaced by a plate 37 such as shown in Fig. 8, wherein half the number of nozzles 38 are provided. The base opening of these nozzles 38, however, is sufficient to receive the material being dispensed from two compartments provided by the separators 18, as indicated in this view. The nozzles, however, may be arranged to receive the material from two or more compartments, as desired.

It may be found desirable in many cases to vary the speed of the gears 12 and 13 in order to dispense materials of different consistency, and this may be possible, as indicated in Figs. 1 and 3, by interchanging the gears 21 and 22. In this case, however, as shown in Fig. 3, it is necessary to drop the pawl 25 so that it will properly engage with the smaller gear 21.

It will thus be seen that I have provided a relatively simple device for dispensing such materials as ice cream, cottage cheese and other materials of a similar consistency, which machine is made of a relatively few number of parts and which can be easily and quickly assembled and disassembled.

Although several embodiments of the invention have been herein shown and described it will be understood that numerous details of the construction shown may be altered or omitted without departing from the spirit of this invention as defined in the following claims.

What I claim is:

1. In a dispensing apparatus, a trough shaped material receiving chamber having arcuate side walls and a bottom provided with an elongated discharge aperture, intermeshing feed gears within said chamber and positioned relatively close to the side walls of said chamber, shaft portions journaled at the ends of said chamber for supporting said feed gears, separator members substantially engaging said side walls and bottom of said chamber, a driven gear rigidly secured to a shaft portion of one feed gear, a drive gear mounted for free rotation on a shaft portion of the other feed gear and meshing with said driven gear, and a pivoted ratchet member associated with said drive gear for rotating the same.

2. In a dispensing apparatus, a trough shaped material receiving chamber having arcuate side walls and a bottom provided with a discharge aperture, intermeshing feed gears within said chamber and positioned relatively close to the side walls of said chamber, shaft portions journaled at the ends of said chamber for supporting said feed gears, separator members substantially engaging said side walls and bottom of said chamber, a driven gear rigidly secured to a shaft portion of one feed gear, a drive gear mounted for free rotation on a shaft portion of the other feed gear and meshing with said driven gear, and a pivoted ratchet member associated with said drive gear for rotating the same, said drive and driven gears having different numbers of teeth.

3. In a dispensing apparatus, a trough shaped material receiving chamber having arcuate side walls and a bottom provided with an elongated discharge aperture, intermeshing feed gears within said chamber and positioned relatively close to the side walls of said chamber, shaft portions journaled at the ends of said chamber for supporting said feed gears, separator members substantially engaging said side walls and bottom of said chamber, a driven gear rigidly secured to a shaft portion of one feed gear, a drive gear mounted for free rotation on a shaft portion of the other feed gear and meshing with said driven gear, a pivoted ratchet member associated with said drive gear for rotating the same, and stop means for limiting the movement of said pivoted ratchet member.

4. In a dispensing machine for semi-solid material, a material receiving trough, a pair of intermeshed dispensing gears mounted within said trough, separators in engagement with the sides and bottom of said trough to divide said trough into compartments, said bottom having a discharge aperture for each of said compartments, said gears having extending shaft portions, a hopper secured to said trough, said hopper and the end walls of said trough having mating journal portions for journaling said extending shaft portions, and means for rotating said gears.

CARL R. TAYLOR.